's
United States Patent [19]

Glanz et al.

[11] 3,726,168
[45] Apr. 10, 1973

[54] DIRECTION CHANGE APPARATUS FOR SHEET CONVEYANCE SYSTEMS

[75] Inventors: Ronald P. Glanz; Clifford D. Shelor, both of Covington, Va.

[73] Assignee: Westvaco Corporation, New York, N.Y.

[22] Filed: July 22, 1971

[21] Appl. No.: 165,851

[52] U.S. Cl. ..........................83/79, 83/96, 83/112, 83/156, 83/158, 83/358, 83/423, 83/425.3, 198/82
[51] Int. Cl. ..............................................B65h 35/02
[58] Field of Search....................83/79, 96, 112, 156, 83/158, 358, 423, 425.3, 159, 160; 198/75, 76, 103, 82

[56] References Cited

UNITED STATES PATENTS

| | | | |
|---|---|---|---|
| 3,224,307 | 12/1965 | Kiuker | 83/112 X |
| 3,486,405 | 12/1969 | Schubert | 83/158 X |

*Primary Examiner*—Frank T. Yost
*Attorney*—Richard L. Schmalz et al.

[57] ABSTRACT

Apparatus for changing the flow direction of a spaced series of planar sheets relative to the orientation of said sheets and subsequently closing the space therebetween under continuous flow conditions of said sheet series.

18 Claims, 5 Drawing Figures

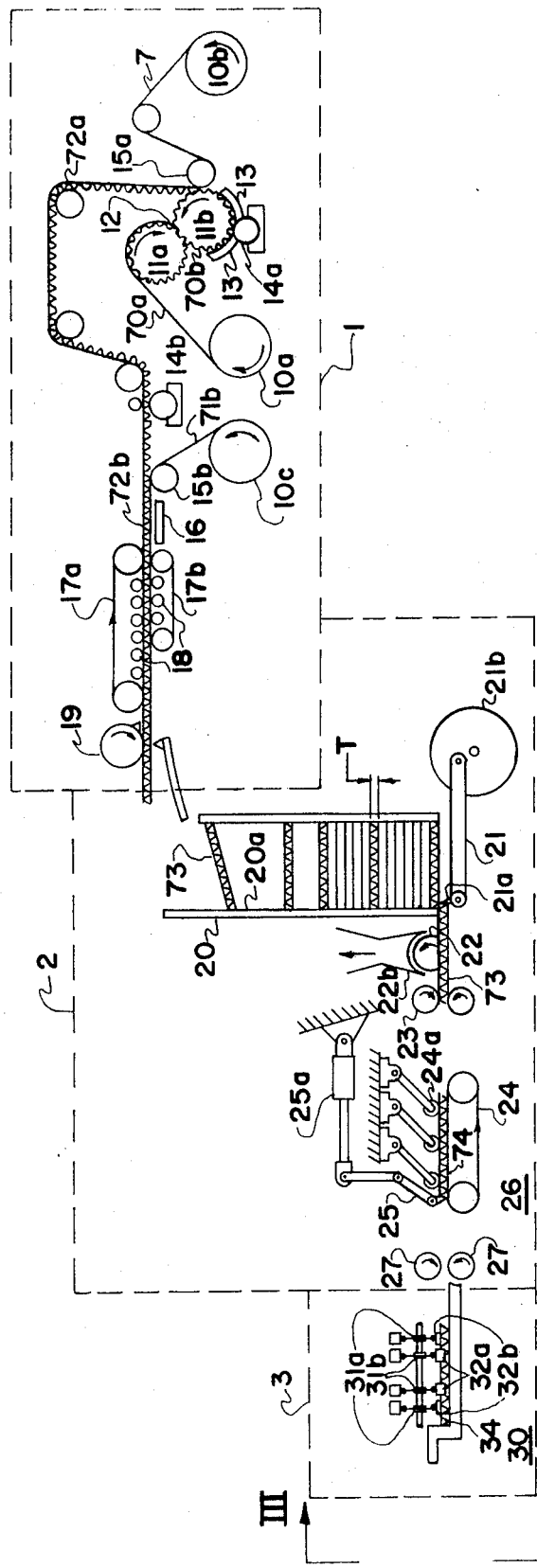
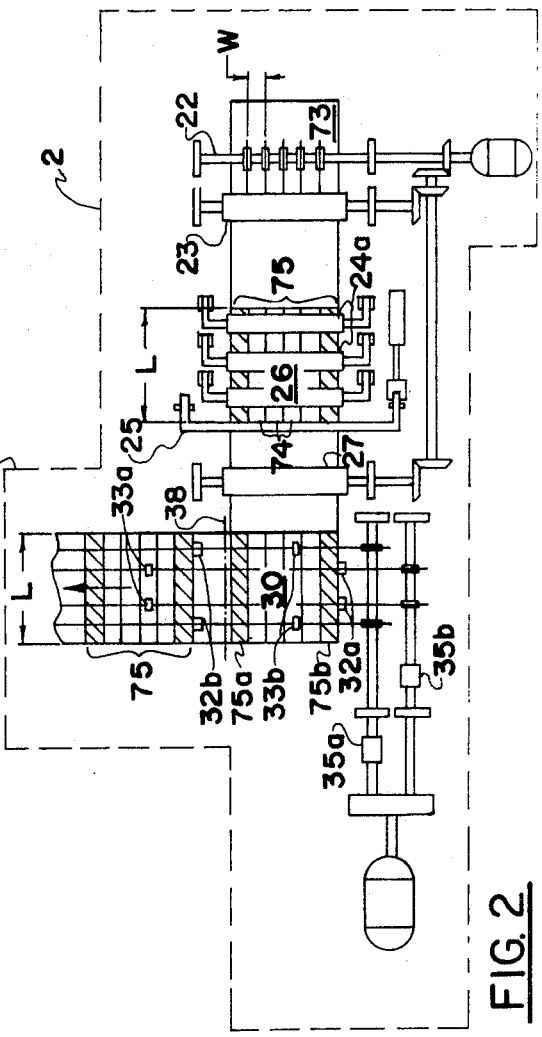
FIG.1
FIG.2
INVENTORS
RONALD P. GLANZ
CLIFFORD D. SHELOR
BY
W.E. Marcontell

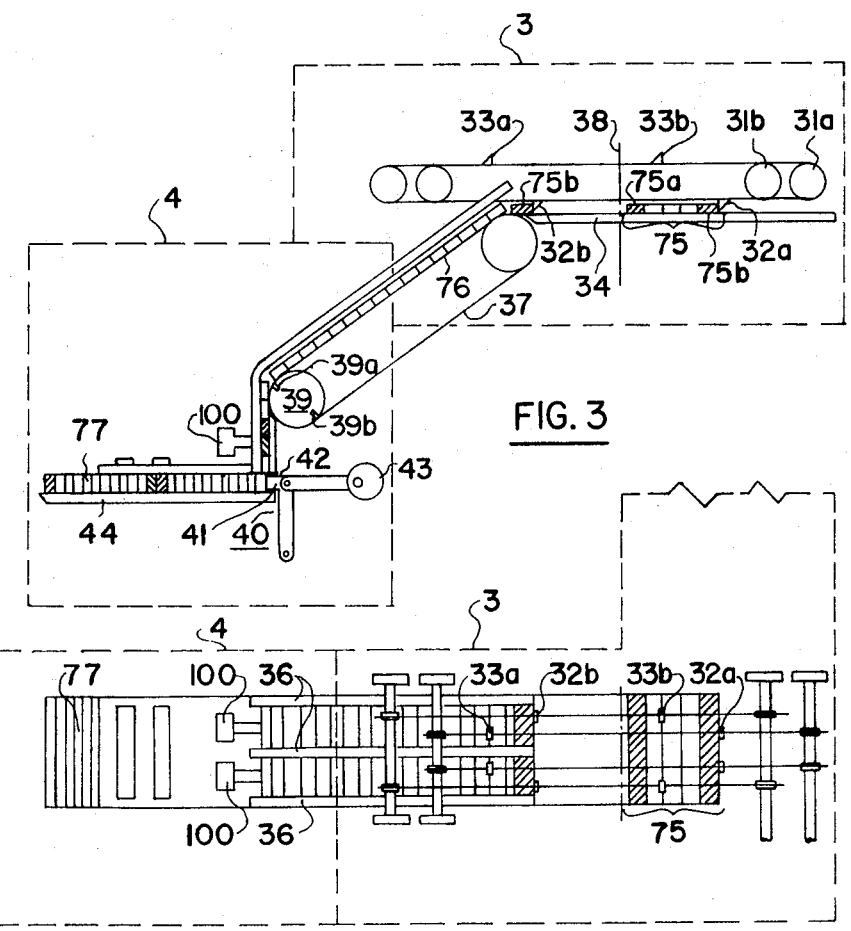

INVENTORS
RONALD P. GLANZ
CLIFFORD D. SHELOR

DIRECTION CHANGE APPARATUS FOR SHEET CONVEYANCE SYSTEMS

BACKGROUND OF THE INVENTION

1. Field of the Invention

This invention relates to a conveyance system for a continuing series of sheets or thin strips of planar material and the reorientation of same relative to the flow direction.

2. Description of the Prior Art

In the continuous production of cellular cores for laminated structural panels from solid or corrugated sheet stock, long strips of relatively slender width are cut from large sheets or a continuous web of supply stock. For the purpose of improved mechanical properties, these strips are turned (collimated) whereby the sheet plane of individual strips is positioned perpendicular to the core or panel face.

If the material flow is unidirectional, however, from cutting station to the collimating station, the linear panel production rate is limited by the rate at which one or very few cutting tools, e.g. saws, can traverse the supply stock width. The U. S. Pat. No. 3,017,971 to Christian discloses such a machine wherein the conveyance line must be stopped while the saw blade, usually mounted on a linearly reciprocable spindle, makes a cutting pass across the stationary conveyance line.

In the present invention, supply stock is hopper fed to the saws as precut panels. Instead of traversing stationary stock with a movable cutting tool, this invention takes advantage of the fact that greater power and cutting plane stability may be delivered to a stationary tool axis. Accordingly, correctly oriented, precut panels are moved past a stationary, gang saw cutting tool rendering the entire panel to strips in a single pass. However, material flow direction of the strips at this point is parallel with the cutting planes. To collimate these strips into laminated cellular cores, it is necessary that the strip flow direction be perpendicular to the cutting planes thereof. Moreover, said strips must be fed to the collimator in an uninterrupted, serial flow sequence. Another object of this invention, therefore, is to cut each panel of a flowing series into a row of strips having laterally adjacent longitudinal edges and sequentially collimating each row into a single continuous column of strips with adjacent longitudinal edges.

Since some operations in the flow sequence require greater time intervals than others, it is a further object of this invention to automatically coordinate events at each operating station to yield the greatest possible flow rate.

BRIEF DESCRIPTION OF THE DRAWINGS

Relative to the drawings wherein like reference characters designate like or corresponding parts throughout the several views:

FIG. 1 is an elevational schematic of the corrugated panel fabricating and sawing operations of the present invention;

FIG. 2 is a plan schematic of the sawing and direction changing operations of the present invention;

FIG. 3 is an elevational schematic of the reoriented strip supply line and collimating operation taken at cut line III—III of FIG. 1;

FIG. 4 is a plan schematic of the reoriented supply and collimating operations of FIG. 3;

DESCRIPTION OF THE PREFERRED EMBODIMENT

Figure 5:
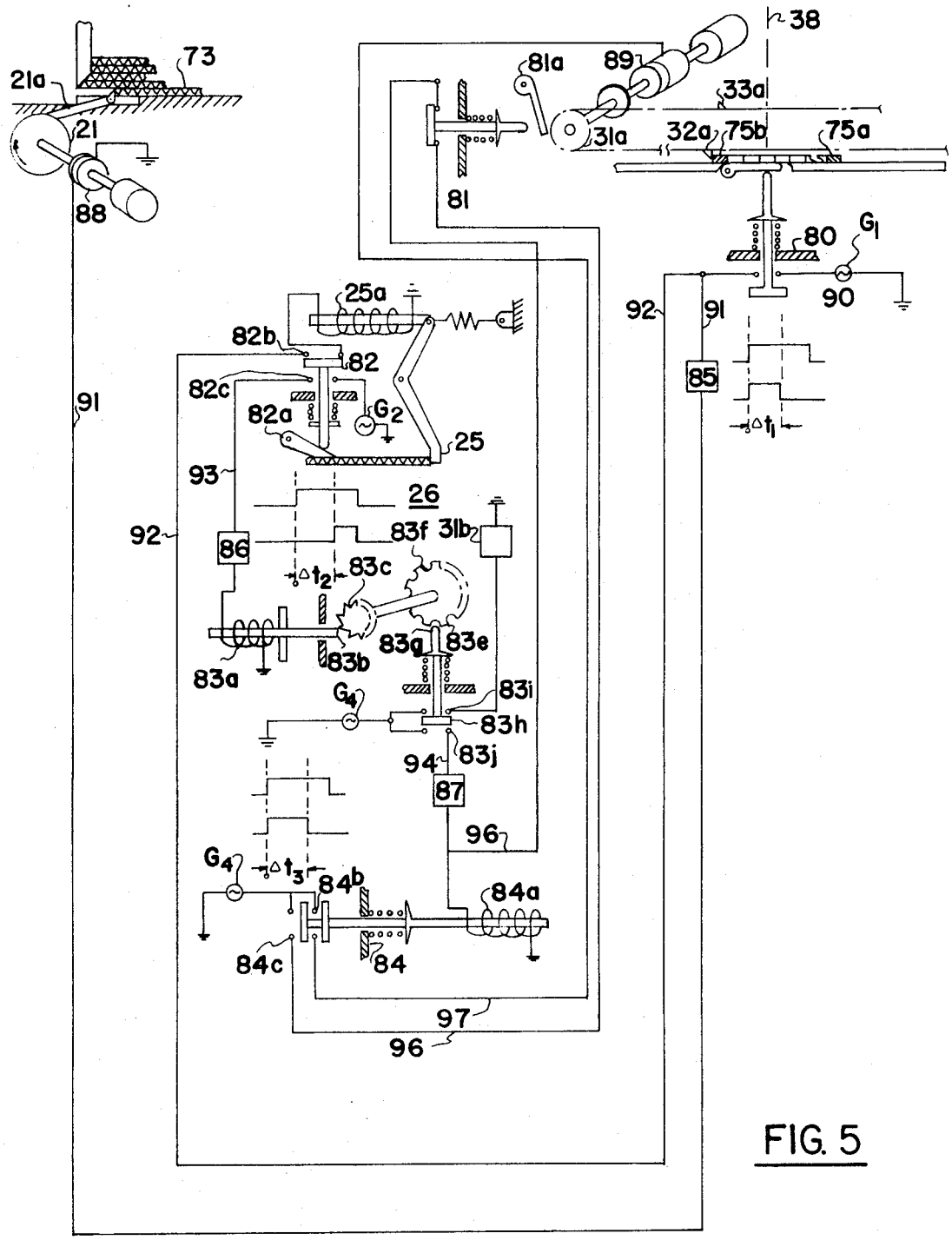
FIG. 5 is a circuitry schematic of the present invention showing the apparatus and logic for controlling material flow from a panel hopper to a strip collimator.

Relative to the elevation of FIG. 1, there is shown, within the area bounded by the dashed line 1, a corrugated web fabricator for solid sheet materials such as kraft paper or aluminum foil. Corrugated panels 73 of uniform size produced by the corrugated fabricator 1 are deposited in the feed hopper 20 of a strip cutting operation 2 to be cut into strips 74. From the cutting operation 2, the strips 74 are deposited at a direction change station 30 of a collimator feed conveyor 3. From the conveyor 3, the strips 74 are fed as a continuous line into a collimating and core panel fabrication operation 4 to be reoriented and structurally bound together as an integral core continuum 77.

The corrugated web operation 1 may be performed independently in time and space of the sawing and reoriented conveyance system of the invention but is most efficiently executed in contiguous proximity thereof.

Starting with the roll 10a of solid material sheet stock, kraft paper for example, web 70a is passed over the corrugating roll 11a and through the nip 12 formed by the meshing involutes of rolls 11a and 11b. Emerging from the nip 12, the corrugated web 70b is held against the involuted surface of roll 11b by retaining fingers 13. Adhesive such as vegetable glue is continuously applied to the involute crest lines of one web face by applicator roll 14a. An uncorrugated web 71a is reeled from roll 10b, passed over an idler roll and around nip roll 15a into pressured contact with the glue lines on corrugated web 70b to form a single faced corrugated web 72a. Other idler rolls direct the web 72a into the nip of glue applicator 14b so adhesive may be applied to the corrugation crest lines on the bottom face of web 70b. Reel 10c supplies the uncorrugated web 71b around nip roll 15b into pressured contact with said bottom crest glue lines to secure the remaining face of a double faced corrugated web 72b. Thereafter the web is drawn over a heater platen 16 by a pulling section comprising traction belts 17a and 17b driven between roller platens 18. Rotary knife 19 cuts the double-faced corrugated web 72b into corrugated panels 73 of uniform length and width which may be gravity dropped into feed hopper 20 of the strip cutting operation 2.

The vertical dimensional relationship between the bottom edge of hopper side 20a and the reciprocating lug 21a of the slider-crank feed mechanism 21 is such as to allow only one panel 73 to be sheared from beneath the hopper stack in a single cycle of the crank 21b.

Advancement of a panel 73 by the lug 21a engages the panel with cutting edges of gang saw 22. The spacing W between each circular blade 22a is such as to divide the panel 73 into a number of long, narrow, thin strips 74, each of uniform width W, length L and thickness T. Although a serrated circular saw has been found for the present to be the most satisfactory cutting device for kraft paper, one attendant disadvantage of the device is the immense production of saw dust necessitating a vacuum removal system 22b. Another disadvantage of the circular saw is material wastage from the saw kerf. Depending on the properties of the solid sheet stock 70 and 71 and the related economics, other cutting techniques such as rotary shears, band saws, hydraulic jets or lasers may be utilized since the cutting function is to completely separate each strip 74 from the one next adjacent.

It should also be noted that orientation of the panel 73 relative to the cutting planes of saw 22 is important to achieve maximum product strength. For corrugated panels from the aforedescribed fabricating operation 1, the cutting planes should be perpendicular to the corrugation flute axes i.e., the major compressive strength direction of panels 73.

Since the stroke of slider-crank mechanism 21 is only sufficient to start the panel 73 through the saw 22, nip rolls 23 are employed to tractionally complete the panel cut pass. Since it is not desirable to interrupt the continuity of the panel cut pass, nip rolls 23 rotate constantly to complete all panel cuts started by the slider crank 21.

From the nip of rolls 23, a strip group 75 comprising strips 74 respective to a single panel 73 is deposited on a continuously moving belt conveyor 24 and restrained by weight rolls 24a to the same relative orientation as cut. However, selective deployment of the retractable fence 25 by electric or fluid powered linear actuator 25a operates to make the conveyor 24 an effective holding station 26. Fence 25 obstructs the progress of group 75 as belt 24 slips thereunder.

When conditions are correct for receipt of the strip group 75 by one of the endless tensile conveyance lines 31a or 31b at the direction change station 30, the fence 25 is lifted by a functioning of the actuator 25a whereupon the belt conveyor 24 is allowed to advance the group 75 into the nip of constantly rotating discharge rolls 27.

Allowing sufficient time to complete the transfer of strip group 75 from the holding station 26 to the direction change station 30, lugs 32a of the inside running tensile conveyor 31a engage the outermost longitudinal edge of the outermost strip 75b to advance the strip group 75 along the sliding surface 34.

Tensile conveyors 31a and 31b, which may be chains, belts, ropes, etc. running on overhead sprockets or sheaves are each driven independently through respective variable speed - force limiting devices such as torque limiters 35a and 35b. When the control logic explained hereafter releases either of the conveyors 31a or 31b to advance a strip group 75 along the flow direction of feed conveyor 3, the conveyor does so with the greatest permissible speed consistent with maintaining the order and alignment of all strips 74 within the group. This speed should be significantly greater than the fastest rate capacity of collimator 4. Accordingly, the leading strip 75a of the group 75 propelled by lugs 32a will overtake the trailing strip 75b of the preceding group propelled by lugs 32b whereupon the speed will be governed by the prevailing rate of the collimator. Since it is highly desirable to advance the series of strips 76 into the collimator 4 in longitudinal edge-to-edge abutment between respective strips, it is necessary to maintain a constant, light pushing force upon the trailing strip of the series by the respective lugs. These several criteria of variable speed and constant force may be performed by a base mounted, input clutch — brake module specified as EM-180-20-30 B in Master Catalog No. 67 of the Warner Electric Brake and Clutch Co., Beloit, Wisconsin.

After the strip series on the collimator feed line 3 passes under the vertical restraining tines 36, a planar divergence is provided between the respective paths of lugs 32 and 33 and the strip feed plane 34 to allow the withdrawal of a lug set.

In the embodiment shown, each tensile conveyance line 31a and 31b is provided with two sets of peripherially opposite lugs: 32a and 33a; and 32b and 33b, respectively. Therefore, in each line 31a and 31b, one pair of lugs, 33a for example, is advancing toward the direction change station 30 while the other set, 32a, is proceeding away with a strip group 75.

For the purpose of fully automatic coordination of strip cutting operation 2 with the direction changing feed conveyor 3, the control logic and apparatus of FIG. 5 may be utilized. The downstream boundary of change station 30 is defined by a planar path 38 wherein is disposed a normally closed limit switch 80. Obviously, any of the numerous devices available for sensing the presence or absence of the strip material such as photoelectric and sonic proximity switches may be used in lieu of switch 80. It is only important that the passage of a strip group 75 be signified by a distinct electrical signal.

Opening of circuit 90 is occasioned by depression of switch trigger 80a when the lead strip 75a of a group passes thereover. The electrical effect of opening circuit 90 is to discharge circuit 91 thereby resetting time delay relay 85 and the single revolution clutch 88 in the drive train of slider-crank feed mechanism 21.

When the trailing strip 75b of a strip group completes passage over switch trigger 80a, clearance of change station 30 is signaled by the switch 80 closure of circuit 90. Energy from source $G_1$ is simultaneously transmitted to circuits 91 and 92.

The bias of $G_1$ present on the input of timing relay 85 in circuit 91 immediately initiates an output conductance to energize single revolution clutch 88 to start one corrugated panel 73 through the saws 22. The output of relay 85 is limited, however, for a time period $\Delta T_1$, less than one complete cycle of crank 21. Without the bias of circuit 91 on the clutch 88 to sustain engagement, disengagement thereof occurs mechanically after one revolution. A single revolution clutch of the type described is available from Precision Specialities, Inc., Delsea Drive, Pitman, New Jersey and specified by their November, 1968, Data Sheet A-16 as an Incremental Rotation Control Package Model CB-6.

If another strip group 75 is waiting at holding station 26, trigger 82a will depress the bus bar of switch 82 into engagement with contacts 82b to complete circuit 92 with the winding of electrical actuator 25a for gate 25. Since the belt conveyor 24 is continuously operating beneath the strip group, movement onto the direction change station 30 thereof begins immediately upon lifting the gate 25. Discharge rolls 27 are also continuously operating, thereby assuring the complete delivery of group 75 to change station 30 even after the trailing end of the group passes trigger 82a to open contacts 82b of circuit 92 thereby closing gate 25.

The absence of material a holding station 26 prompts the closure of contacts 82c to complete the circuit 93 with energy source $G_2$. From that moment, time delay relay 86 starts counting down to $\Delta T_2$, a function of the time required for the foregoing strip group 75 to be completely deposited and settled at change station 30. At the expiration of $\Delta T_2$, relay 86 transmits a single pulse to distributor switch winding 83a and cuts off. The single pulse from relay 86 is sufficient to cycle the linear pawl 83b against one spur of wheel 83c thereby indexing cam 83d from the preceding high surface position 83e to the next low position 83f. Cam follower 83g reciprocates between said cam highs and lows to alternate bus bar 83h between contacts 83i and 83j, completing circuits 95 and 94 with energy source $G_3$, respectively and exclusively.

Circuit 95 includes a control complement for tensile conveyor 31b identical to that for 31a described below. The primary function of distributor switch 83 is, therefore, to select which of the two independently driven tensile conveyors shall carry the next strip group 75.

When distributor switch cam 83d is indexed to a high position 83e relative to the follower 83g, bus bar 83h closes contacts 83j in circuit 94 with energy source $G_3$. The consequent input bias on time delay relay 87 initiates immediate conductance from the output thereof to the winding 84a of holding relay 84. Said relay output is limited, however, for the discrete period of time $\Delta T_3$ necessary to close and lock said holding relay 84.

Actuation of winding 84a closes contacts 84b and 84c between energy source $G_4$ and circuits 96 and 97. Circuit 97 conducts energy to electric clutch 89 in the drive train of tensile conveyor 31a. Circuit 97 provides a continuing conduit of energy from source $G_4$ to winding 84a to hold contacts 84b and 84c closed after time period $\Delta T_3$ has expired and relay 87 has ceased conducting.

The function of holding circuit 96 is to keep conveyor 31a drive train engaged after switch 80 has called it into service. This condition must be sustained until the engaged lug set, 32a for example has released its charge of strips to the belt conveyor 37. At this time, peripherially opposite lug 33a approaches the actuating finger 81a of interrupting switch 81. When opened, switch 81 interrupts the holding circuit 96 for holding relay 84 thereby interrupting the power circuit 97 to clutch 89 and stopping tensile conveyor 31a.

Without the interrupting switch 81, once a tensile conveyor was started there would be no coordination between the placement of a strip group 75 in the direction change station 30 and the location of a lug. Manual surveillance would be required to prevent interferences.

Belt conveyor 37 propels the strip line 76 into the collimator 40 after the withdrawal of tensile conveyor lugs therefrom. Additional thrust to each strip 74 is provided from dogs 39a and 39b which are compliant, centrifugal extensions of belt sheave 39. Dogs 39a and 39b provide a concentrated, positive loading force for collimator breech 41 to assure that a single strip 74 advances completely into the breech 41 during the reciprocatory half-cycle interim that the trip-hammer 42 is withdrawn therefrom.

Although not critical, the line of belt conveyor 37 is a convenient location for one or more adhesive applicators 100 to dispense adhesive to at least one face of strips 74.

The actual collimating function is performed as an individual strip 74 is thrust edge first into the breech 41 against the surface of table 44 with the corrugation flute axes perpendicular thereto. Trip-hammer 42, cyclically driven by eccentric 43, strikes one face of the strip 74 to push it clear of the breech 41; into intimate, face-to-face contact with the preceding strip; and to advance the entire, collimated series of strips along the table surface 44.

Although a preferred circuitry apparatus for the coordinated control of sheet material from the hopper 20 to a discharge receptacle such as belt conveyor 37 has been disclosed herein, it should be understood that numerous functional equivalents utilizing semiconducting devices may be substituted therefor. The significance of the preferred circuit is to illustrate the coordinating logic whereby the removal of a strip group 75 from the direction change station 30 first starts a new panel 73 into the saws 22. While the sawing operation proceeds, the slowest of the series, any group 75 present at the holding station 26 is conveyed onto the change station 30. Depending on the exact locations of switches 81 and 82, the time required for group 75 to settle onto change station 30 and the startup speed of the tensile conveyors, the clutch 89 is engaged at the moment required to allow lugs 33a to engage the strip group 75 immediately after settling.

With proper adjustment of minimum requisite time delay cycles, an apparatus constructed according to the present invention should convey approximately 1,000, three-eighths in. strips per minute from 60 + 60 inch panels of double face, A/A flute, 42 pound kraft paper corrugated board stock.

While the primary objective of this invention has been to cut and facilitate the orderly flow of long, norrow strips of thin sheet material, it should be recognized that the invention will expedite the orderly flow of uncut panels in those circumstances where panel reorientation relative to flow direction is necessary between two successive operations.

We claim as our invention:

1. Material transfer apparatus for sustaining a constant relative orientation between each of a flowing series of planar sheets and changing the flow direction thereof, said apparatus comprising:
   first conveyance means extending along a first direction to deliver a spaced planar series of parallel planar sheets from a source to a direction change station with a predetermined relative orientation and holding station therebetween;
   second conveyance means extending along a second direction substantially transverse to said first direction to serially deliver said sheets from said direction change station to a receptacle without said planar spacing and without changing said relative orientation; and
   control means for regulating the flow of sheets from said source to said first conveyance means, from said holding station to said change station and the engagement of said sheets by said second conveyance means at said change station.

2. Apparatus as described by claim 1 wherein said source of parallel planar sheets comprises cutting means for cutting large planar sheets into a plurality of smaller planar sheets along substantially equally spaced parallel cutting planes extending coplanar with said first direction.

3. Apparatus as described by claim 1 wherein said holding station comprises means to stop movement of a particular sheet before delivery to said change station without stopping movement of sheets following thereafter.

4. Apparatus as described by claim 1 werein said second conveyance means comprises a plurality of conveyor elements, each element having mutually independent driving means that are engagably dependent on said control means.

5. Apparatus as described by claim 3 wherein said holding station comprises removable, sheet movement obstructing means.

6. Apparatus as described by claim 4 wherein said driving means each deliver a predetermined, relatively constant force over a speed range including stationary.

7. Apparatus as described by claim 6 wherein said control means comprises first sheet sensing means adjacent to and down stream of said direction change station, said sensing means transmitting a first signal to deposit a single sheet with said first conveyance means when the passage of a sheet is sensed thereby.

8. Apparatus as described by claim 7 wherein said control means further comprises second sheet sensing means adjacent said holding station whereby said first signal is further transmitted to actuator means to remove said holding station obstruction means when the presence of a sheet at said holding station is sensed by said second sensing means.

9. Apparatus as described by claim 8 wherein said second conveyance means comprises a plurality of conveyor elements, each element having mutually independent driving means that are engagably dependent on said control means and operable to deliver a predetermined, relatively constant force over a speed range including stationary.

10. Apparatus as described by claim 9 wherein said second sensing means transmits a second signal to second conveyance element selector means when a sheet passes from said holding station to engage said conveyance element with respective driving means.

11. Apparatus as described by claim 10 further comprising conveyance element stop control means respective to each of said elements, said stop control means causing the disengagement of respective drive means after deposit of a sheet with said receptacle.

12. Apparatus for the continuous fabrication and supply of long narrow strips from relatively thin panels of sheet material, said apparatus comprising:

first and second material flow directions, each substantially transverse of the other;

cutting means for successively cutting first and second panels of sheet material into a plurality of long, narrow strips along cutting planes parallel with said first flow direction;

first conveyance means for successively delivering said panels through said cutting means;

second conveyance means for delivering strip groups respective to said panels emerging from said cutting means to a holding station and to a flow directional change station in the order and orientation as cut;

third conveyance means for engaging said first panel strip group, in the orientation as cut, at said change station and moving same along said second flow direction;

fourth conveyance means for engaging said second panel strip group, in the orientation as cut, at said change station and moving same along the same path in said second flow direction as followed by said first panel strip group; and, first control means for stopping said second panel strip group movement at said holding station until said third conveyance means moves said first panel strip group clear of said change station.

13. Apparatus as described by claim 12 further comprising second control means for selectively stopping either of said third and fourth conveyance means until a respective panel strip group is completely delivered to said change station.

14. Apparatus as described by claim 13 wherein said second material flow direction path comprises a stationary surface for sliding said strips and said third and fourth conveyance means comprise endless tensile members having lugs secured thereto for pushing said strips along said sliding surface.

15. Apparatus as described by claim 13 further comprising independent driving and force control means respective to each of said third and fourth conveyance means whereby the leading strip of said second panel strip group may abut but not otherwise disturb the trailing strip of said first panel strip group along said second flow path.

16. Apparatus as described by claim 14 wherein said third and fourth conveyance means each comprise at least two sets of lugs whereby one set approaches said change station while the other set delivers a respective panel strip group therefrom.

17. Apparatus as described by claim 12 wherein said first conveyance means function cyclically to deliver a single panel through said cutting means per cycle, each being started by signal means responsive to the clearance of a preceeding panel strip group from said change station.

18. Apparatus as described by claim 17 wherein said signal means is emitted by said first control means.

* * * * *